May 16, 1933.  A. FEIGELSON  1,909,396
TRAILER
Filed May 24, 1930  2 Sheets-Sheet 1
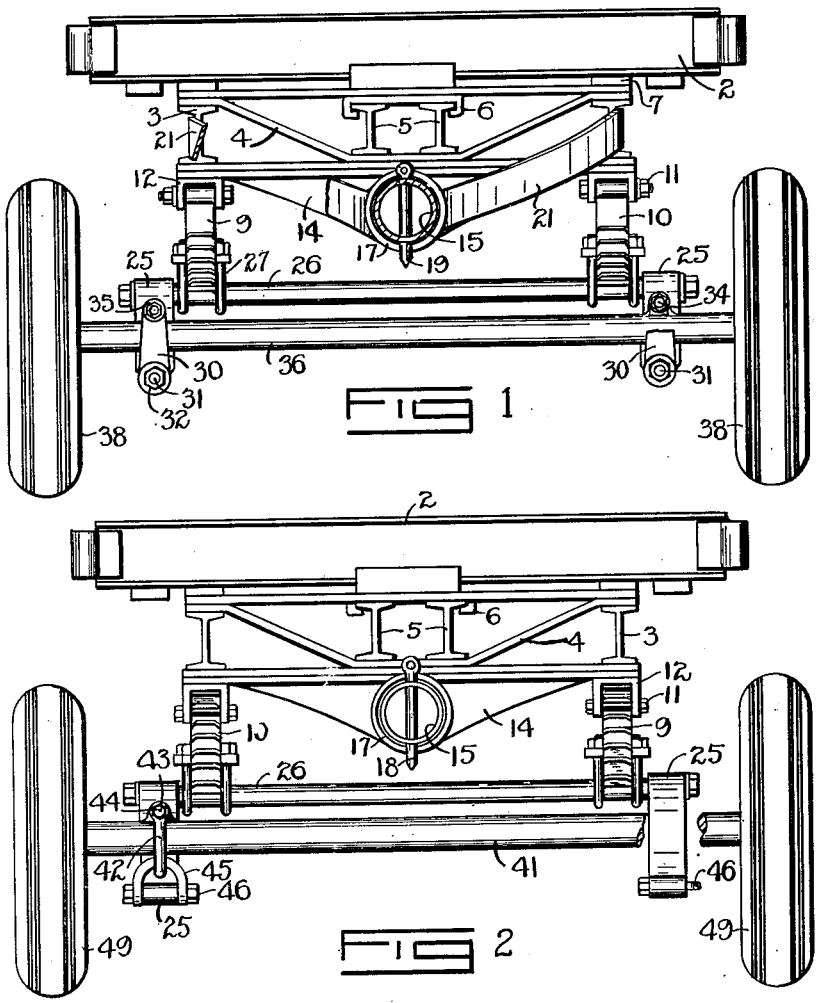
ALEXANDER FEIGELSON.
INVENTOR
BY Jesse R Stone
Lester B. Clark.
ATTORNEYS May 16, 1933.　　A. FEIGELSON　　1,909,396
TRAILER
Filed May 24, 1930　　2 Sheets-Sheet 2
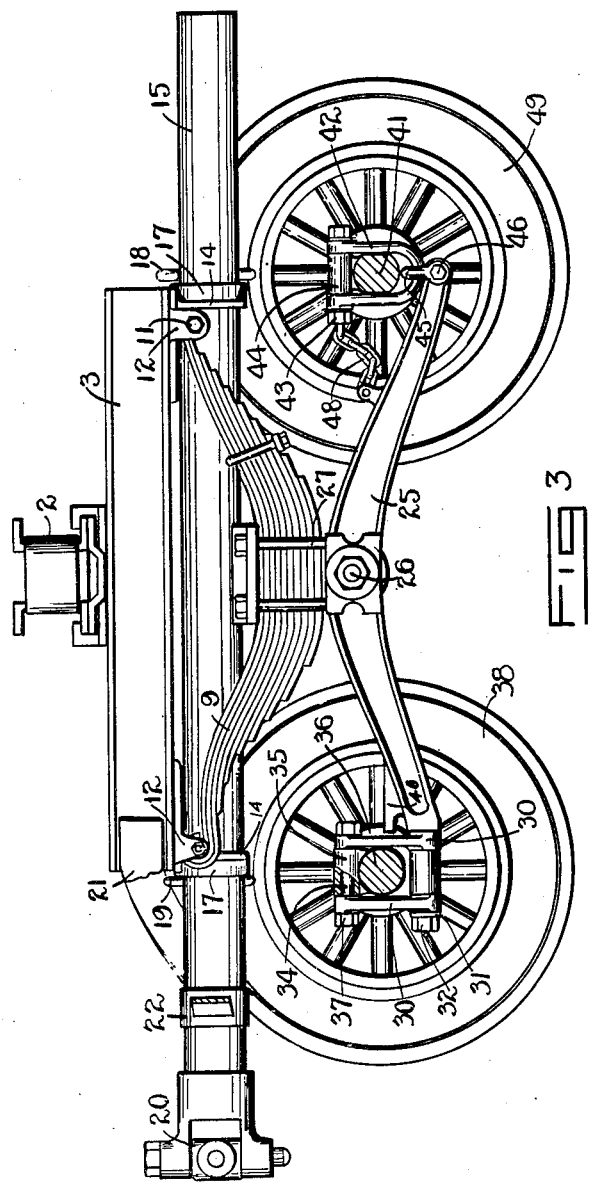
ALEXANDER FEIGELSON.
INVENTOR
BY Jesse R Stone
Lester B Clark.
ATTORNEYS Patented May 16, 1933

1,909,396

UNITED STATES PATENT OFFICE

ALEXANDER FEIGELSON, OF BEAUMONT, TEXAS

TRAILER

Application filed May 24, 1930. Serial No. 455,161.

The invention relates to an improvement in trailers particularly of the type which are used in transporting heavy loads. It is understood that various types of trailers have been manufactured heretofore and various expedients have been resorted to in an attempt to distribute the load over more than two tires or contacts with the road. With the present day construction and the enormous loads which are carried upon trucks and trailers different state highway commissions have passed regulations regarding the maximum load which may be carried per square inch of tire contact with the road, or per wheel per tire, or per axle. As a consequence of these regulations various expedients have been resorted to, such as the provision of dual tires, dual axles, etc. These expedients, however, have as a general rule resulted in certain detrimental effects upon the tire and upon the roadability of the trailer, due to the fact that the wheels were rigidly mounted and if one wheel had rolling contact with the road surface other of the wheels would be subjected to more or less sliding contact so that satisfactory results have been impossible. It is with the object of providing a four-wheel trailer which will give an even distribution of the load upon four contact surfaces, and with the idea in view of allowing limited flexibility of the wheels, that I have devised the present invention.

It is one of the objects of the invention to provide a trailer having front and rear axles upon which the trailer frame is mounted for limited movement.

Another object of the invention is to provide a trailer having front and rear axles which are mounted for lateral movement in any direction with respect to the trailer frame.

Another object of the invention is to provide a trailer wherein the front axle will tend to track with the rear wheels of the vehicle to which the trailer is attached.

A still further object of the invention is to provide a trailer wherein the front axle will be mounted with respect to the trailer frame so that it may have limited steering action.

It is also an object of the invention to provide a trailer having a rear axle upon which the load is mounted for universal pivotal movement.

A still further object of the invention is to provide a trailer with a rear axle which is adapted for limited steering movement to track with the front wheels of the trailer.

It is also an object of the invention to provide a trailer with a sliding bolster which will permit limited flexibility of the trailer structure with respect to the load and the wheels.

Other and further objects of the invention will be readily apparent when the following description is considered in connection with the accompanying drawings wherein Fig. 1 is a front elevation of a trailer constructed in accordance with my invention and showing certain parts broken away for clarity.

Fig. 2 is a rear elevation of the trailer with certain parts broken away.

Fig. 3 is a side elevation with two of the wheels removed and showing the axles in section.

The present invention is directed to a combination of the sliding bolster disclosed in my prior Patent No. 1,351,102, granted August 31, 1920, with the idea of a trailer having flexibly mounted axles, these two lending themselves to considerable flexibility in the under-carriage of the trailer with respect to the load which is being transported. The bolster disclosed in my prior patent is indicated generally at 2 and is mounted upon the longitudinal frame members 3. These members are connected by the cross braces 4 to form a unitary structure. Intermediate the longitudinal members 3 are the central members 5, which carry the yoke 6, which is adapted to slide thereon to support the bolster 2. The shoes 7 are adapted to slide along the members 3 and serve as an additional balancing rack for the bolster 2. The bolster and frame are mounted upon the springs 9 and 10 on opposite sides thereof which are pivoted at 11 and slidable at 12 in suitable connecting members which are of standard construction. Below the cross beams 4 adjacent each end thereof is the cross brace 14. This brace is of triangular construction and has a central opening therein to receive the coupling pole 15. Each of the brace members 14 carry a ring 17, which is rigidly affixed thereto. The rear pin 18 and the front pin 19 pass through suitable openings in the coupling pole 15 so that the trailer will be securely anchored with respect to the coupling pole. It is noted that the pin 19 extends in front of the forward ring 17, whereas the rear pin 18 extends through the coupling pole behind the rear ring 17. In this manner when the pins are placed the tractor will be substantially immovable with respect to the coupling pole 15 except for rotational movement of the coupling pole. This in event the trailer travels on a sloping surface or traverses a road which is banked the trailer may rotate about the coupling pole as an axis and no twisting movement or torque will be imparted to the coupling 20 which serves as a connection for the trailer and the truck or vehicle which is to pull the trailer.

With the foregoing construction it will be apparent that the coupling pole is free to rotate with respect to the trailer so that the trailer is flexibly mounted with respect to the coupling pole. The braces 21 extend forwardly from each side of the trailer body and connect with a brace ring 22 through which the coupling pole 15 is adapted to pass. The sliding bolster 2 which is adapted to slide longitudinally on the central members 5 and the longitudinal members 3 also allows of limited flexibility of the trailer with respect to the load.

In order that the axles may be flexibly mounted with respect to the trailer body, I have provided an equalizer bar 25 which serves as a support for each of the springs of the trailer. This equalizer bar may be formed of any suitable structural member and I have here provided one of I beam formation. This equalizer bar is provided with an opening to receive the shaft 26 upon which the springs 9 and 10 are mounted by means of the bolts 27. It is understood that the shaft 26 is rigidly held by the U-bolts 27 so that it is immovable. This shaft, however, is adapted for rotation in the opening through the equalizer bars 25 which serve as a bearing for this shaft and the trailer body. The views of the drawings show the carriage or body of the trailer as remaining in a horizontal position. It is, however, free to pivot about the shaft 26 as a center.

The axles of the trailer are flexibly mounted with respect to the equalizer bars 25. The front and rear mountings are of different construction in order to obtain the greater flexibility of the wheels with respect to the trailer. The front mounting consists of two links 30 which are adapted to extend over the rounded forward end 31 of the equalizer bar 25. These links 30 are adapted to pivot about the equalizer bar 25 as an axis and are retained in position by the nut 32. The upper end of the links are mounted upon a bolt 34 which passes through a sleeve 35. This sleeve is welded or otherwise rigidly affixed upon the upper side of the front axle 36. A nut 37 retains the links in proper position on the bolt so that they extend down in front and in the rear of the axle 36 but are free to pivot on the bolt 34 as well as upon the forward end 31 of the equalizer bar. With this construction it seems apparent that the forward end of the equalizer bar is free to swing longitudinally of the axle 36, or in other words, transversely of the line of travel of the trailer. When the truck or vehicle which is pulling the trailer negotiates a turn a lateral pull is exerted upon the coupling 20, which turns the coupling pole 15 with respect to the line of travel of the trailer. This movement exerts a side thrust upon the equalizer bar 25 and tends to turn it about in a horizontal plane with the center of gravity of the load as an axis. This movement is transmitted to the links 30 which immediately swing with respect to the equalizer bar and the bolt 34. This swinging movement tends to move the front wheel 38, which is on the inside of the curve, to the rear, whereas it moves the wheel, which is on the outside of the curve, forwardly, so that the front axle 36 is subjected to a limited steering movement which assists it in negotiating the curve. With trailers where the springs are mounted rigidly with respect to the axle, if a curve is to be negotiated, there is no play or movement permitted and any twisting action imparted to the coupling pole can only be absorbed by sliding friction of the tires laterally upon the road surface.

With this applicant's structure, however, this lateral movement is taken up by the links 30, which turn the axle 36 so that it will negotiate the curve and any sliding friction of the tires on the road is consequently eliminated. A stop member 40 has been shown as extending forwardly from the upper surface of the equalizer bar 25 and is of such length that it limits the rearward movement of the axle 36 by engaging the rear link.

The mounting of the rear axle 31 is more flexible than the forward axle and comprises a U bolt or shackle 42, which is mounted upon a bolt 43 passing through a sleeve 44 similar to the one described in connection with the front axle. Thus the U bolt or shackle 42 serves the same purpose and is mounted similarly to the link 30 on the front axle. In order, however, that greater flexibility will be permitted a second shackle 45 is provided which passes through the lower end of the upper shackle 42. This lower shackle 45 carries a bolt 46, which passes laterally through the rear end of the equalizer bar 25. Thus the shackle 45 is adapted to pivot longitudinally of the equalizer bar 25, whereas the shackle 42 is adapted to pivot laterally or transversely of the equalizer bar 25. This arrangement allows a universal pivoting movement of the axle 41 with respect to the equalizer bar 25. A chain or other retaining device 48 is provided to limit the movement of the axle 41 with respect to the equalizer bar 25. When a curve is to be negotiated and the coupling pole 15 is twisted by the pull of the power vehicle the forward end of the equalizer bars 25 move as previously described. The rear end, however, being to the rear of the center of gravity of the load which is carried by the trailer, move in the opposite direction to that of the links 30, which are forward of the center of gravity of the trailer load.

The links or shackles accordingly swing laterally in a direction opposite to the forward links 30. This movement causes a slight steering action of the rear axle 41 in a direction opposite to the steering action which has occurred on the front axle 36. Thus the rear wheels 49 tend to track behind the front wheels 38 and suitable steering action is obtained automatically due to the flexible mounting of the axles and the equalizer bar with respect to the trailer body. The rear wheels will not be subjected to any sliding friction on the road surface due to the torque or lateral twisting of the coupling pole 15, as the load will be swung laterally upon the U bolts 42 and thus tend to steer the rear axle around the curve. The wheel or side of the axle which is on the inside of the curve will thus move forwardly, whereas the end of the axle which is on the outside of the curve will move rearwardly. A trailer embodying the construction just described has been made and the foregoing operations have been found to occur.

Other advantages of the present construction reside in the flexible mounting so that when the trailer traverses uneven ground the equalizer bars 25 will pivot with respect to the springs 27 and the shaft 26. Thus when one wheel traverses a high or low area the equalizer bar connected to that wheel will shift relative to the axle 41 either forwardly or rearwardly, as obviously the distance between the front axle 36 and the rear axle 41 varies when the wheels connected to the axles are on uneven ground. The lower shackle 45 comes into play when such circumstances exist, and pivots about the bolt 46 to allow a slight change in the distance between the front and the rear axles. This also eliminates any sliding friction of the wheel upon the road surface as the wheel is free for forward or rearward movement with respect to the bolt 46 and is not compelled to travel in a rigidly coupled position with respect to the front axle 36 as has been necessary in the structures heretofore encountered.

In event the front wheel strikes an obstruction or moves into a pocket the entire load is shifted forward by the pivoting movement of the lower shackle 45 the same as if the rear wheel had encountered the obstruction; the shifting or lateral swinging of the equalizer bar at the forward end is accommodated by the links 30 when one end of the axle 36 is lower than the other. It is to be understood that there is absolutely no rigid arrangement in the entire trailer as both the front and the rear axles are free for flexibility in their movement. They are, however, constrained for limited flexibility and it has been found that they operate very satisfactorily with an enormous saving in tire upkeep and permit the trailer to negotiate uneven surfaces which had heretofore been impossible.

The sliding bolster lends itself to the flexible construction of the trailer and due to the sliding support of this bolster the trailer is allowed to move with respect to the load which it supports so that a great deal of the vibration and twisting stresses which have heretofore been imparted to the load are now absorbed entirely by the trailer and bolster so that the load is maintained in a substantially level and even position regardless of the uneven character of the surface over which the trailer is traveling or regardless of the degree of the curve which is being negotiated.

What I claim as new is:

1. A trailer of the class described adapted to be propelled by a coupling pole, a trailer body mounted to receive said pole rotatably with respect thereto, springs supporting said body, equalizer bars pivoted to each spring, and axles connected to the ends of said equalizer bars, one of said connections including two shackles disposed at right angles to each other whereby that axle may have universal movement with respect to the equalizer bars.

2. A trailer including a body, a coupling pole connected therewith, front and real axles, springs on said body, equalizer bars flexibly connected with said axles and supporting said springs and body, a universal connection between one axle and said equalizer bars and a lateral swinging connection between the other axle and the other ends of said bars.

3. A trailer including front and rear axles, wheels thereon, equalizer bars between said axles, links pivotally supported on said front axles and adapted to swing parallel with the axis of said axle, a pivotal connection between the lower ends of said links and said equalizer bars, a universal connection between the rearward ends of said equalizer bars and said rear axles, springs supported on said equalizer bars, and a body supported on said springs.

In testimony whereof I hereunto affix my signature this 17th day of May, A. D. 1930.

ALEXANDER FEIGELSON.